US010137999B2

(12) United States Patent
Nelson et al.

(10) Patent No.: US 10,137,999 B2
(45) Date of Patent: Nov. 27, 2018

(54) METHODS AND APPARATUS FOR DETECTING AIRFLOW CONTROL SURFACE SKEW CONDITIONS

(71) Applicant: The Boeing Company, Chicago, IL (US)

(72) Inventors: Harvey C. Nelson, Mill Creek, WA (US); Christopher E. Plass, Monroe, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/474,261

(22) Filed: Mar. 30, 2017

(65) Prior Publication Data

US 2018/0281987 A1   Oct. 4, 2018

(51) Int. Cl.
| G08B 21/00 | (2006.01) |
| B64D 45/00 | (2006.01) |
| G08B 21/18 | (2006.01) |
| B64C 13/28 | (2006.01) |

(52) U.S. Cl.
CPC ....... B64D 45/0005 (2013.01); G08B 21/187 (2013.01); *B64C 13/28* (2013.01); *B64D 2045/001* (2013.01)

(58) Field of Classification Search
CPC .......... B64D 45/0005; B64D 2045/001; G08B 21/187; B64C 13/28; B64C 13/503; B64C 13/16; B64C 2045/0085; G01D 5/353; G01K 11/3206; Y02T 50/44

USPC ......................................... 340/945–979, 686
See application file for complete search history.

(56) References Cited

U.S. PATENT DOCUMENTS

| 7,891,611 B2 | 2/2011 | Huynh et al. |
| 8,156,887 B2 | 4/2012 | Tan et al. |
| 8,880,242 B2* | 11/2014 | Hinnant, Jr. ........... B64D 45/00 |
| | | 701/29.2 |
| 2002/0116147 A1* | 8/2002 | Vock ....................... A63C 5/06 |
| | | 702/182 |
| 2010/0277346 A1* | 11/2010 | Moy .................. B64D 45/0005 |
| | | 340/945 |
| 2017/0158348 A1* | 6/2017 | Teubner ................ B64D 45/00 |

OTHER PUBLICATIONS

May et al., "Design of a Comprehensive Condition Monitoring System for Gas Turbine Engines," Proceedings of the Canadian Engineering Education Association, Aug. 2011, 10 pages.
(Continued)

*Primary Examiner* — Anh V La
(74) *Attorney, Agent, or Firm* — Hanley, Flight and Zimmerman, LLC

(57) ABSTRACT

Methods and apparatus for detecting airflow control surface skew conditions are disclosed herein. An example apparatus includes an aircraft wing, a support linkage, and a flap coupled to the aircraft wing via the support linkage. The example apparatus includes a sensor coupled to the flap at a location proximate to the support linkage. The sensor is configured to generate vibration data for the location. The example apparatus includes a detector communicatively coupled to the sensor. The detector is to detect a skew condition of the flap based on the vibration data.

19 Claims, 10 Drawing Sheets

(56) References Cited

OTHER PUBLICATIONS

International Organization for Standardization, "ISO 10816-4:2009: Mechanical Vibration—Evaluation of Machine Vibration by Measurement on Non-Rotating Parts—Part 4: Gas Turbine Sets with Fluid-Film Bearings," Oct. 2009, available at https://www.iso.org/standard/40458.html (last accessed Jan. 26, 2017), 4 pages. (Abstract only).

"Dynamics—"Things that Shake, Rattle and Roll" Vibration & Modal Analysis," available at http://www.eng.buffalo.edu/~abani/fem/dyn/dynold.html (last accessed Jan. 24, 2017), 9 pages.

\* cited by examiner

METHODS AND APPARATUS FOR DETECTING AIRFLOW CONTROL SURFACE SKEW CONDITIONS

FIELD OF THE DISCLOSURE

This disclosure relates generally to airflow control surfaces such as a flap of an aircraft and, more particularly, to methods and apparatus for detecting airflow control surface skew conditions.

BACKGROUND

A wing of an example aircraft includes a flap that can be extended during takeoff or landing to increase lift of the wing and retracted to reduce drag when, for example, the aircraft reaches a cruising altitude. The flap is coupled to the wing via one or more support linkages. The support linkages enable adjustment of the flap by providing a hinged coupling of the flap to the wing.

SUMMARY

An example apparatus includes an aircraft wing, a support linkage, and a flap coupled to the aircraft wing via the support linkage. The example apparatus includes a sensor coupled to the flap at a location proximate to the support linkage. The sensor is configured to generate vibration data for the location. The example apparatus includes a detector communicatively coupled to the sensor. The detector is to detect a skew condition of the flap based on the vibration data.

An example method includes generating, via a sensor coupled to an airflow control surface of a vehicle, vibration data for the airflow control surface. The example method includes generating, by executing an instruction with a processor, spectral data based on the vibration data. The example method includes performing, by executing an instruction with the processor, a comparison of the spectral data to predetermined spectral data. The example method includes detecting, by executing an instruction with the processor, a skew condition of the airflow control surface based on the comparison Another example method includes accessing, by executing an instruction with a processor, vibration data for a flap of an aircraft, the vibration data to be generated by a sensor coupled to the flap. The example method includes comparing, by executing an instruction with the processor, the vibration data and predetermined vibration data to identify a skew condition of the flap.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

Figure 1:
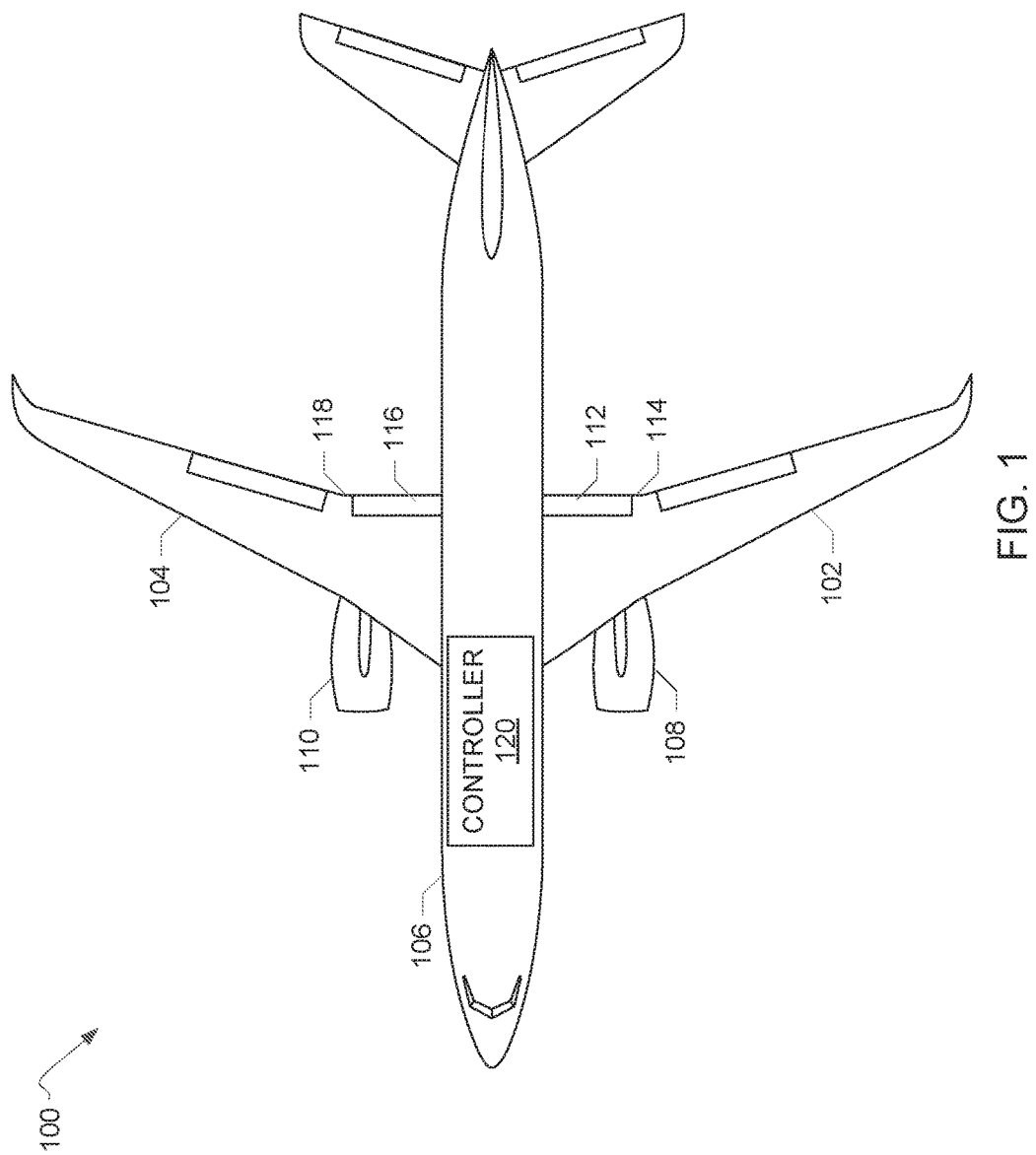
FIG. 1 illustrates an example aircraft which may be used to implement the example methods and apparatus disclosed herein.

Some aircraft include a wing having an airflow control surface such as a flap coupled thereto (e.g., at a trailing edge of the wing). The flap can be adjusted during different stages of flight of the aircraft. The flap can be extended, for example, during takeoff or landing to increase lift of the wing. The flap can be retracted to reduce drag when, for example, the aircraft reaches a cruising altitude.

The flap is typically coupled to the wing via one or more support linkages that enable the flap to be selectively retracted or extended. The support linkage enables load forces to be transferred from the flap to the wing. An example support linkage includes one or more joints (e.g., pin joints or hinges) and one or more links or arms that support the flap when the flap is in a stowed position or an extended position. The support linkage is communicatively coupled to an actuator that controls a position of the flap via manipulation of the joint(s) of the support linkage.

In some examples, a first support linkage is located at an outboard side of the wing, or proximate to a tip of the wing, and a second support linkage is located at an inboard side of the wing to couple the flap to the wing at two locations. In such examples, load forces are transmitted to the wing via the first support linkage and the second support linkage. Also, the flap is rotationally constrained at the first support linkage and the second support linkage. Thus, the flap is substantially prevented from rotating, which may interfere with performance of the flap.

One or more components of the first and/or second support linkages can mechanically fail due to wear, impact, etc. For example, an arm of the first support linkage can become impaired (e.g., damaged) such that no load is transferred between the wing and the flap via the arm. However, the flap is still mechanically coupled to the wing via one or more joints of the first support linkage. In such examples, the flap is no longer rotationally constrained by the first support linkage because of the mechanical impairment at the arm of the first support linkage. Instead, the flap is rotationally constrained only by the second support linkage. The flap may rotate about one of the joints of the first support linkage such that the flap is twisted. Therefore, the first support linkage or the support linkage requiring repair causes a skew condition of the flap, or a condition in which rotational constraints on the flap are disrupted at one or more support linkages.

FAA regulations require damage tolerance evaluations of aircraft structures. Compliance with such regulations includes monitoring for flap skew conditions to determine if one or more support linkages require repair. In some known examples, a flap skew condition is detected by measuring a degree of misalignment between a position of the first support linkage and a position of the second support linkage relative to the aircraft wing. For example, angular misalignment between the support linkages relative to the wing can serve as an indicator that the flap is skewed and one of the support linkages needs to be repaired. However, angular misalignment between the support linkages may be difficult to accurately detect. For example, asymmetric loads may be carried by each of the support linkages. An outboard support linkage may carry a heavier load than an inboard support linkage. Thus, angular misalignment between the two support linkages may be difficult to detect with respect to the inboard support linkage, or the linkage carrying the smaller load, as the inboard support linkage experiences less of a change in angular position when in need of repair as compared to the outboard support linkage carrying the heavier load.

Examples disclosed herein provide for detection of skew conditions at airflow control surface(s) such as a flap of an aircraft based on analysis of vibration data collected via one or more sensors coupled to the flap. In examples disclosed herein, one or more sensors (e.g., an accelerometer) are coupled to the flap to measure vibration of the flap with respect to magnitude and frequency. The vibration data collected from the flap can be compared to reference data collected from a non-skewed flap and/or reference data collected from a known skewed flap. In some examples, noise factors such as damping factors and/or excitation forces can cause the flap to vibrate at a frequency that is different (e.g., slightly different) than a natural vibration frequency of the flap. Some disclosed examples detect shifts in peaks in vibration frequency data spectrums relative to peaks in the reference data due to the changes in the vibration frequency relative to the natural frequency. Based on the shifts in the peaks, disclosed examples identify skew conditions. Some disclosed examples identify skew conditions based on a magnitude of frequency data relative to reference frequency data using one or more filtering techniques (e.g., band pass filtering). Based on the identification of skew conditions at the flap, one or more outputs can be generated in the form of, for example, a warning displayed to an aircraft pilot or maintenance personnel indicating that one or more of support linkages require repair. The use of vibration data provides an efficient and sensitive means of detecting a mechanical state of the inboard support linkage as compared to collecting positional measurements of the support linkages and evaluating alignment.

FIG. 1 is a top view of an example aircraft 100 that may be used to implement the example methods and apparatus disclosed herein. The example aircraft 100 includes a first wing 102, a second wing 104, and a fuselage 106. The example aircraft 100 of FIG. 1 includes a first engine 108 coupled to the first wing 102 and a second engine 110 coupled to the second wing 104. In the example aircraft 100 of FIG. 1, a first flap 112 is coupled to a trailing edge 114 of the first wing 102. A second flap 116 is coupled to a trailing edge 118 of the second wing 104. The example aircraft 100 of FIG. 1 includes a controller 120 (e.g., a processor) to receive one or more instructions from, for example, a pilot of the aircraft 100. The example controller 120 provides one or more instructions to one or more components of the aircraft 100. For example, the example controller 120 can control extension or retraction of the first flap 112 and the second flap 116 by providing instruction(s) to respective actuators associated with the first flap 112 and the second flap 116. Although examples disclosed herein are discussed in conjunction with the example aircraft 100 of FIG. 1, the examples may be implemented with other types of aircraft, vehicles, and/or non-vehicular structures (e.g., machinery).

Figure 2:
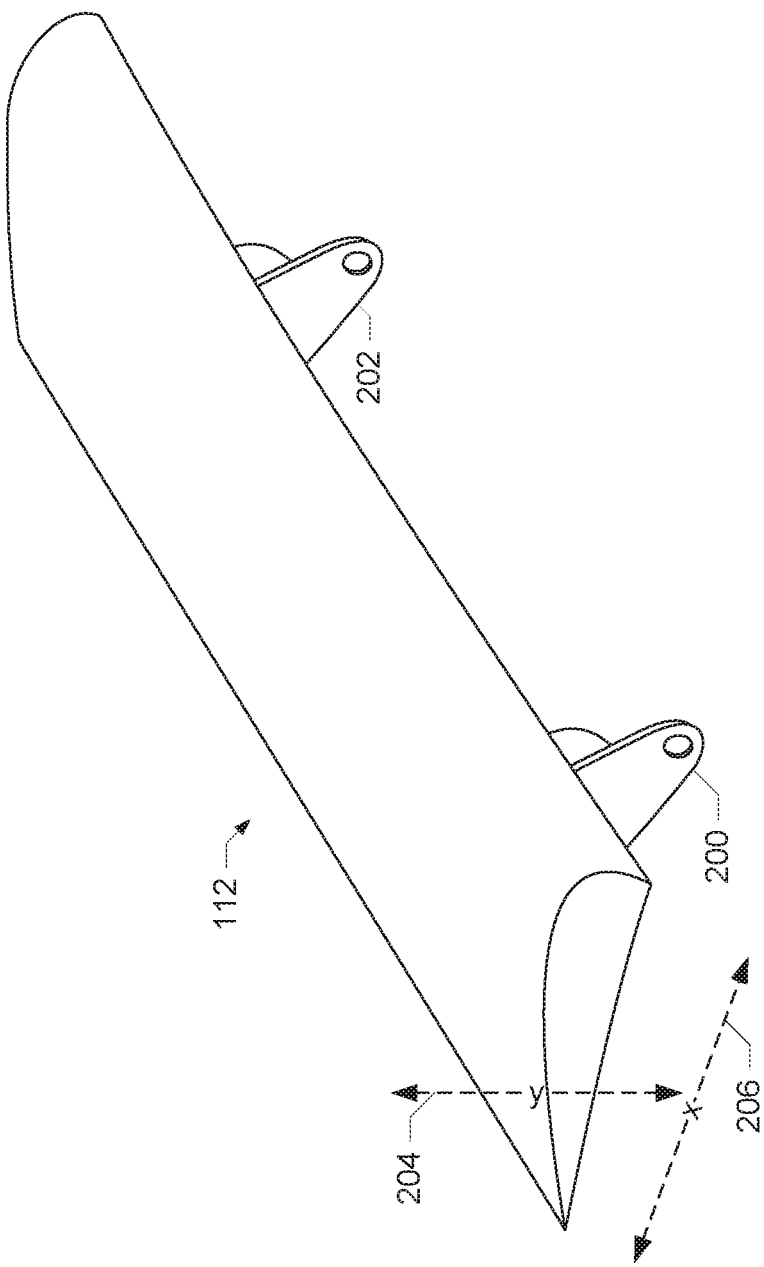
FIG. 2 is a perspective view of an example flap of the example aircraft of FIG. 1.

FIG. 2 is a perspective view of the example first flap 112 of the aircraft 100 of FIG. 1. As illustrated in FIG. 2, the example first flap 112 has a substantially airfoil shape. However, the example flap 112 of FIG. 2 can have other shapes than that illustrated in FIG. 2, can include one or more slots, etc.

The example first flap 112 is coupled to the first wing 102 of the example aircraft 100 of FIG. 1 via a first support linkage 200 and a second support linkage 202. When the first flap 112 is coupled to the first wing 102 of the aircraft of FIG. 1, the first support linkage 200 is located closer to the fuselage 106 of the aircraft of FIG. 1 and, thus, is an inboard support linkage. The second support linkage 202 is an outboard support linkage that is located closer to a tip of the first wing 102 of FIG. 1 when the first flap 112 is coupled to the first wing 102. The first and second support linkages 200, 202 enable forces to be transferred from the first flap 112 to the first wing 102. The loads carried by the first support linkage 200 and the second support linkage 202 can be symmetric (e.g., equal loads carried by each of the linkages) or asymmetric (e.g., one of the linkages carries greater load than the other linkage). In some examples, the second or outboard support linkage 202 carries a greater load than the first or inboard support linkage 200. The example first flap 112 of FIGS. 1 and 2 can include additional or fewer support linkages to couple the flap to the first wing 102.

The first flap 112 may experience vibrations during flight. Frequencies and modes of vibration of the first flap 112 are based on, for example, a mass of the first flap 112, a length of the first flap 112, a width of the first flap 112, an airfoil shape of the first flap 112 (e.g., which affects mass distribution and lift), the use of any stiffening element(s) in the first flap 112 such as spars, stiffness of the material(s) of the first flap 112, locations at which the first flap 112 couples to the first wing 102 via the first and second support linkages 200, 202 and/or a manner in which the first flap 112 is coupled to the first wing 102, a speed of the aircraft 100, etc. Vibrations experienced by the first flap 112 can be based on a position of the first flap 112 and/or a flight phase, such as takeoff or landing. For example, the first flap 112 may vibrate or bend substantially vertically or along a y-axis, as represented by the arrow 204 of FIG. 2. Also, the first flap 112 may vibrate along an x-axis, as represented by the arrow 206 in FIG. 2. The first flap 112 may also vibrate in the z-axis direction. In operation (e.g., under non-skew conditions), the first and second support linkages 200, 202 of FIG. 2 rotationally constrain the first flap 112 from, for example, twisting, pitching, or otherwise rotating when the first flap 112 is coupled to the first wing 102.

Figure 3:
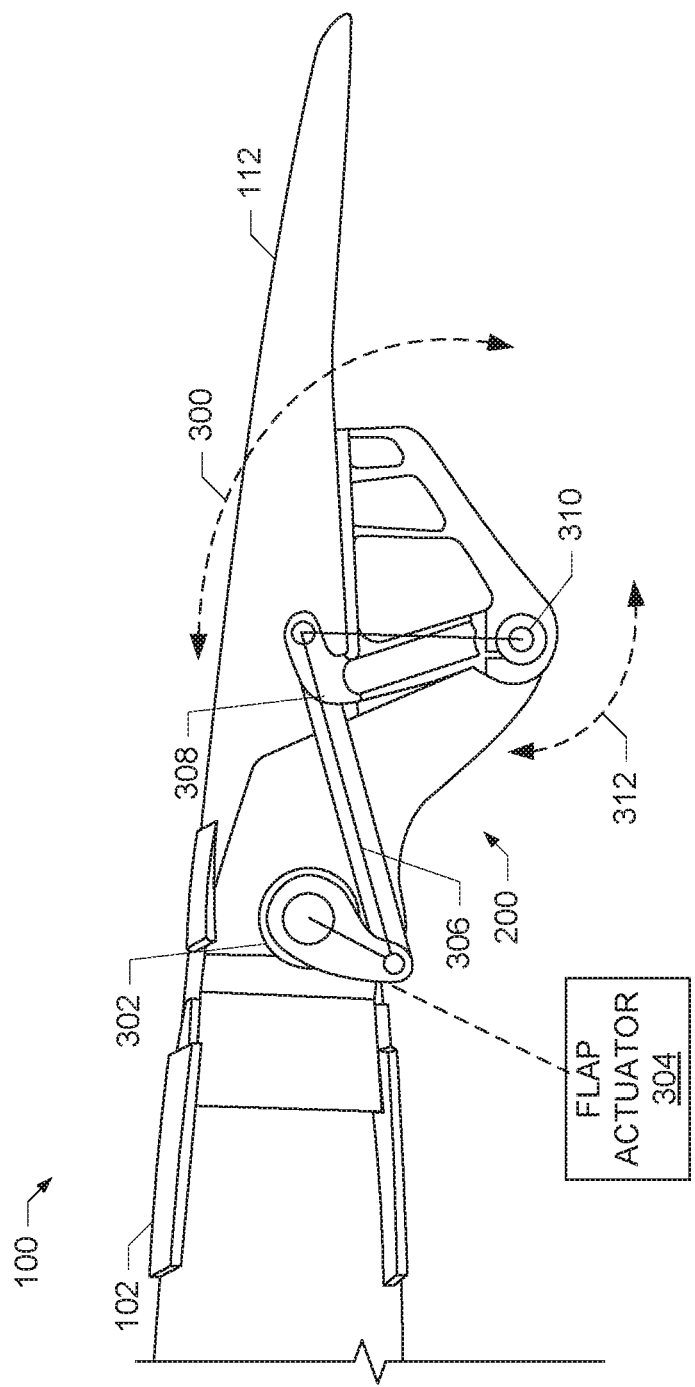
FIG. 3 is a schematic illustration of an example support linkage that may be used to couple the flap of FIG. 2 to a wing of the example aircraft of FIG. 1.

FIG. 3 is a schematic illustration of the first flap 112 coupled to the first wing 102 of the example aircraft 100 of FIG. 1 via the first support linkage 200 of FIG. 2. The first support linkage 200 and/or the second support linkage 202 can have different designs than illustrated in FIG. 3.

FIG. 3 illustrates the first flap 112 in a first or retracted position. As represented by the first arrow 300, the first flap 112 can move to a second or extended position via actuation of the first support linkage 200. The example first support linkage 200 of FIG. 3 includes a first joint 302. The first joint 302 is coupled to the first wing 102. The first joint 302 is operatively coupled to a flap actuator 304, which provides torque to the first joint 302 to cause the first flap 112 to retract or extend based on one or more instructions received from, for example, the controller 120 of the aircraft 100 of FIG. 1.

The example first support linkage 200 of FIG. 3 includes a drive arm 306 coupled to the first joint 302 and a second joint 308. The example first support linkage 200 includes a third joint 310. The first joint 302, second joint 308, third joint 310, and the drive arm 306 operate to pivot the first flap 112 between the stowed position of FIG. 3 and the extended position. The first, second, and/or third joints 302, 308, 310 may be, for example, pin joints.

In some examples, a mechanical impairment can occur at, for example, the first joint 302, the drive arm 306, the second joint 308, etc. In such examples, the transfer of forces between the first flap 112 and the first wing 102 via the first support linkage 200 is disrupted. However, the first flap 112 is still coupled to the first wing 102 via the third joint 310. If there is a mechanical impairment at the drive arm 306, no load is transmitted between the flap actuator 304 and the first flap 112 via the drive arm 306. Further, the first flap 112 is no longer rotationally constrained by the first joint 302 and the drive arm 306 of the first support linkage 200. Thus, performance of the first support linkage 200 is degraded. As a result, the first support linkage 200 is free to rotate about the third joint 310, as represented by the second arrow 312 of FIG. 3. Put another way, the first flap 112 is skewed at the side of the first flap 112 proximate to the first support linkage 200.

Although the first support linkage 200 is mechanically impaired, the first support linkage 200 can still react to forces in the y-axis and x-axis directions. As discussed above, during operation, the first flap 112 can vibrate in the x, y, and/or z directions at a natural or substantially frequency. When the rotational constraints of the first flap 112 are disrupted due to, for example, a mechanical impairment at one or more components of the first support linkage 200, vibrations (e.g., translational and/or torsional vibrations) of the first flap 112 change with respect to a frequency and a magnitude of the vibrations. Put another way, the first flap 112 vibrates at a different natural frequency as compared to when the rotational constraints of the first flap 112 are not disrupted.

Thus, changes in fixity of the first support linkage 200 (or the second support linkage 202) affect the vibration characteristics of the first flap 112, such as natural frequency and modes of vibration. The difference in the torsional and translational vibration characteristics of the first flap 112 when the first support linkage 200 is in a fully operational state and when the first support linkage 200 is mechanically impaired can be used to detect a skew condition of the first flap 112. The detection of the skew condition of the first flap 112 due to changes in fixity (e.g., fixity of a location on the geometry) serves as an indication that the first support linkage 200 may need repair.

Examples disclosed herein detect changes in the vibrational behavior of the first flap 112 that are indicative of skew conditions at the first flap 112 based on translational and torsional vibration data generated by one or more sensors coupled to the first flap 112 during flight or testing.

Figure 4:
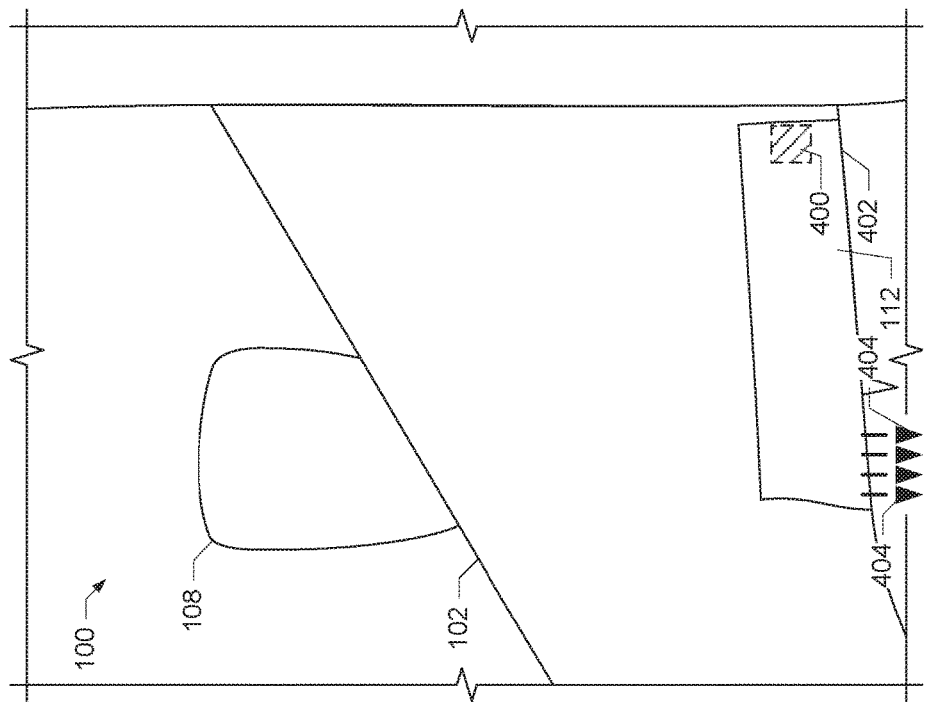
FIG. 4 is a top, partial view of an example wing and an example flap of the aircraft of FIG. 1.

FIG. 4 is a partial view of the example aircraft 100 of FIG. 1 including the first wing 102, the first engine 108, and the first flap 112. Although FIG. 4 illustrates the first wing 102 and the first flap 112, the examples disclosed herein could be implemented with the second wing 104 and the second flap 116 in a substantially similar manner.

As illustrated in FIG. 4, a sensor 400 is coupled to the first flap 112. In the example of FIG. 4, the sensor 400 is an accelerometer. However, the example sensor 400 could be another type of sensor that measures for example, rotation, angular position, etc. The first flap 112 can include additional sensors coupled thereto than illustrated in FIG. 4. The example sensor 400 measures one or more vibration characteristics (e.g., acceleration, rotation) and generates signal data during one or more flight phases, such as a takeoff, approach, or landing. In some examples, the sensor 400 collects data when the first flap 112 is extended but not when the first flap 112 is retracted. In some examples, the sensor 400 measures the vibration characteristic(s) (e.g., acceleration) substantially continuously during flight. In other examples, the sensor 400 collects data when the aircraft 100 is parked and dedicated skew detection testing is performed.

In the example of FIG. 4, the sensor 400 is disposed proximate to a surface 402 (e.g., an underside surface) of the first flap 112 that is impinged by air from the first engine 108 during operation of the first engine 108, as represented by the arrows 404. The exposure of the surface 402 of the first flap 112 to the engine air causes the first flap 112 to vibrate (e.g., the first flap 112 is excited by the airflow). In some examples, the first flap 112 is impinged by engine air during flight. In other examples, the example aircraft 100 is parked and the first engine 108 is operated to cause the first flap 112 to vibrate for testing purposes. In examples where the first flap 112 is not located proximate to (e.g., behind) the first engine 108, freestream air flow could be used to drive vibration of the first flap 112. In some examples, engine air and freestream air flow cause vibration of the first flap 112 during flight of the aircraft 100.

Figure 5:
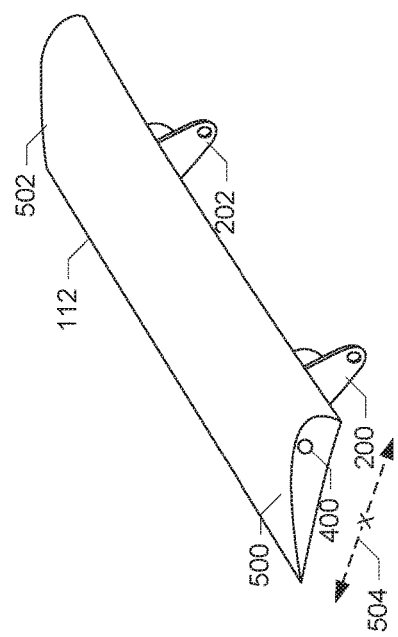
FIG. 5 is a perspective view of the example flap of FIG. 2 including a sensor coupled thereto in accordance with the teachings of this disclosure.

FIG. 5 is a perspective view of the first flap 112 including the example sensor 400 coupled thereto. As illustrated in FIG. 5, the sensor 400 is disposed at a first end 500 of the first flap 112 proximate to the first support linkage 200. The first flap 112 can include one or more sensors disposed at a second end 502 opposite the first end 500 and proximate to the second support linkage 202. In the example of FIG. 5, the sensor 400 is an accelerometer that measures acceleration of the first flap 112 in the x-direction, or the fore-aft direction, at the location on the first flap 112 where the sensor 400 is disposed, as represented by the arrow 504 of FIG. 5. In some examples, the sensor 400 measures acceleration in a direction tangential to an arc about a hinge line of the first flap 112 at the first support linkage 200 and/or the second support linkage 202 as the first flap 112 vibrates. Thus, the example sensor 400 generates signal data indicative of vibration characteristics of the first flap 112 in the x-direction for the sensor location on the first flap 112.

In the example of FIG. 5, the sensor 400 is disposed proximate to the first support linkage 200. The placement near the first support linkage enables the sensor 400 to more readily detect changes in the vibration characteristics of the first flap 112 due to a mechanical impairment at the first support linkage 200 as compared to if the sensor 400 was disposed farther away from the first support linkage 200. For example, if the sensor 400 was disposed proximate to a center of the first flap 112, a change in vibration magnitude measured at the center of the first flap 112 by the sensor 400 between non-skew and skew conditions would be smaller and, thus, more difficult to detect than a change in vibration magnitude measured by the sensor 400 when the sensor 400 is located proximate to the first support linkage 200. The effect of the disruption to the rotational constraint of the first flap 112 is not as significant at center of the first flap 112. Thus, placement of the sensor 400 proximate to the first support linkage 200 provides for increased accuracy in measuring changes in vibration frequency characteristics of the first flap 112. In some examples, the placement of the sensor 400 relative to the first flap 112 is determined based on a comparison of data (e.g., empirical data, simulation data) collected when the sensor 400 is located at different positions on the flap (e.g., the center, proximate or distal to the edge of the wing, etc.).

Figure 6:
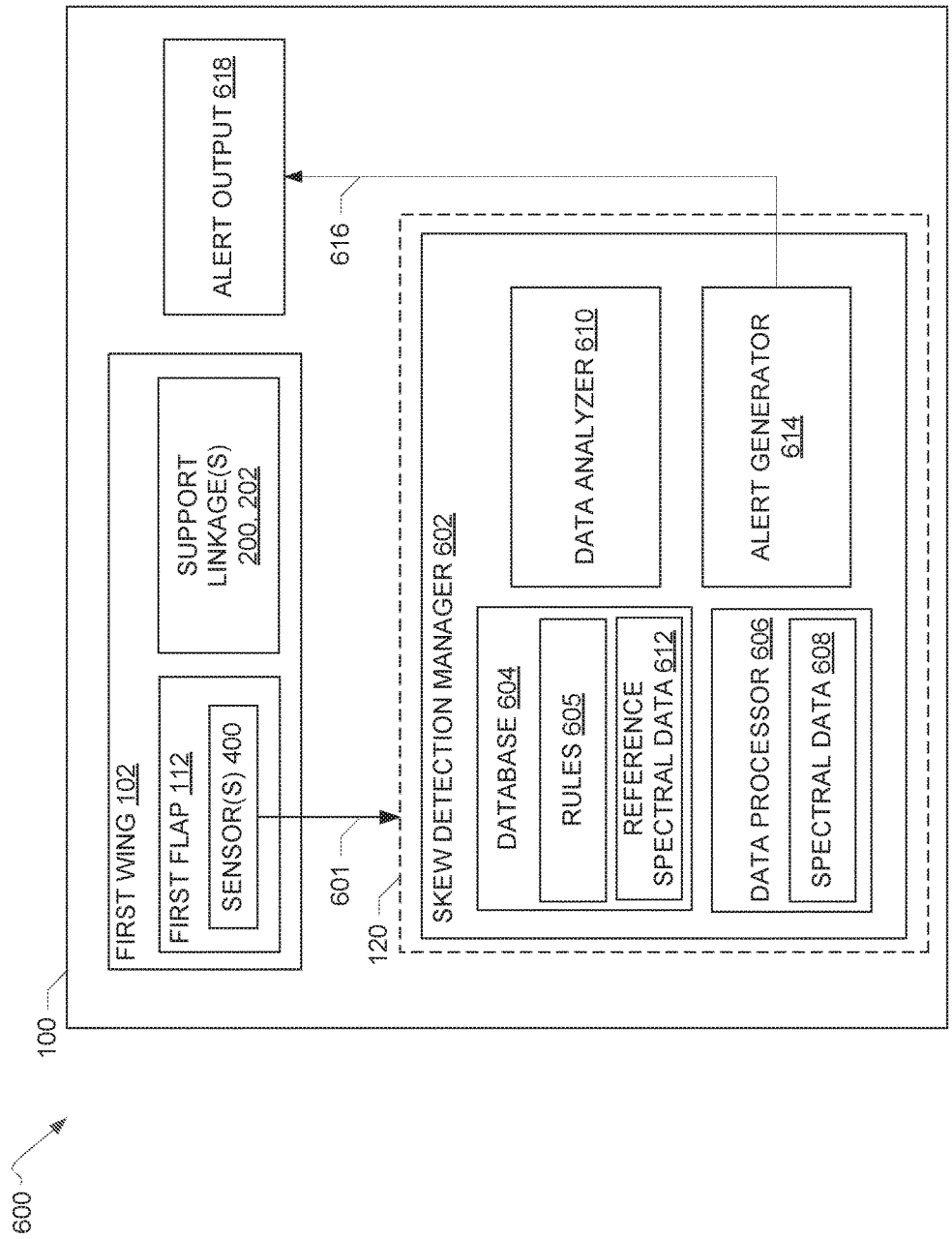
FIG. 6 is a block diagram of a first example skew condition detection system, which may be used to detect a skew condition of a flap of the example aircraft of FIG. 1.

FIG. 6 is a block diagram of a first example system 600 for detecting skew conditions at a flap of an aircraft, such as the first flap 112 of the example aircraft 100 of FIG. 1, based on data collected by one or more sensors coupled to the flap, such as the sensor 400 of FIGS. 4 and 5. As illustrated in FIG. 6, the example aircraft 100 includes the first wing 102 including the first flap 112 coupled thereto via the first and second support linkages 200, 202. The first flap 112 includes one or more sensors 400 coupled thereto as disclosed above in connection with FIGS. 4 and 5. For example, the sensor(s) 400 can be coupled to the first flap 112 proximate to the first support linkage 200 and/or the second support linkage 202. Although the first example skew detection system 600 of FIG. 6 is discussed in connection with the first flap 112 of the aircraft 100 of FIGS. 1-5, the first example skew detection system 600 could be implemented with another flap of the example aircraft 100, such as another flap of the first wing 102 and/or the second flap 116 of the second wing 104. The first example skew detection system 600 of FIG. 6 can also be implemented with other components of the example aircraft 100 of FIG. 1 (e.g., other wing components), such as an aileron or a spoiler. The first example skew detection system 600 can be implemented with airflow control surfaces of other vehicles, such as a spoiler of an automobile.

The sensor(s) 400 of the example system 600 of FIG. 6 measure vibration characteristics of the first flap 112 as a result of, for example, impingement of engine air on the first flap 112 or freestream air flow. As disclosed above, the sensor(s) 400 generate signal data indicative of characteristics of the vibrational behavior of the first flap 112 (e.g., translational and torsional vibration). The sensor(s) 400 generate vibration characteristic data or test data 601 that is used by the example system 600 to determine a skew state of the first flap 112 based on the data. The sensor(s) 400 of FIG. 6 can generate the test data 601 during one or more flight phases (e.g., takeoff, landing), substantially continuously during flight, instances when the first flap 112 is extended (e.g., partially extended, fully extended), instances when the first flap 112 is retracted, and/or when the aircraft 100 is parked with the first engine 108 running for testing purposes. The time periods over which the sensor(s) 400 collect data can be based on one or more user inputs or rules (e.g., received and stored by the controller 120 of the aircraft 100).

As disclosed above, the sensor(s) 400 generate translational and torsional vibration characteristic data for the first flap 112. In the example of FIG. 6, the sensor(s) 400 include accelerometers to measure acceleration of the first flap 112 in the x-direction, or the fore-aft direction, during flap vibration, in a direction tangential to an arc about a hinge line of the first flap 112 at the first support linkage 200, etc. Thus, in the example of FIG. 6, the test data 601 is accelerometer data. The test data 601 includes acceleration measurements read by the sensor(s) 400 over one or more predefined periods of time (e.g., corresponding to takeoff, for the duration of flight). The test data 601 includes acceleration measurements at location(s) on the first flap 112 where the sensor(s) 400 are located.

In the example system 600 of FIG. 6, the sensor(s) 400 transmit the test data 601 (e.g., the accelerometer data) to the controller 120 of the example aircraft 100. The sensors(s) 400 can transmit the test data 601 to the controller 120 via a communications link, such as a wireless communications link between the sensor(s) 400 and the controller 120.

The example controller 120 includes a skew detection manager 602 to process the test data 601 (e.g., the acceleration data) generated by the sensor(s) 400 and to analyze the data to determine a skew condition of the first flap 112. The skew detection manager 602 includes a database 604 to store the test data 601 received from the sensor(s) 400. In some examples, the database 604 stores the test data 601 based on the time period over which the test data 601 was generated, such as during takeoff, approach, and/or landing. The example database 604 can store one or more rules 605 with respect to, for example, the time periods over which the sensor(s) 400 should collect the test data 601, data regarding the locations of the sensor(s) 400, etc.

The example skew detection manager 602 includes a data processor 606. In the example of FIG. 6, the data processor 606 processes the test data 601 (e.g., the acceleration data) by applying a Fourier Transform to the test data 601 to generate spectral data 608 in the frequency domain. In some examples, the data processor 606 generates spectral data 608 for each of the flight phases for which the test data 601 is generated by the sensor(s) 400, such as takeoff and/or landing. The data processor 606 can process or transform the signal data in other ways than a Fourier Transform.

The example skew detection manager 602 includes a data analyzer 610. The data analyzer 610 analyzes the spectral data 608 to detect a skew condition of the first flap 112. In the example system of FIG. 6, the data analyzer 610 analyzes the spectral data 608 relative to predetermined or reference spectral data 612 stored in the database 604. The reference spectral data 612 includes spectral data based on vibration characteristic data previously collected via sensor(s) (e.g., the sensor(s) 400) from the first flap 112 or from another flap, such as a flap having a similar geometry as the first flap 112. In some examples, the reference spectral data 612 is based on flight simulations. The example reference spectral data 612 of FIG. 6 includes spectral data for a flap in a known non-skew condition, such as when neither of the support linkages requires repair. In some examples, the reference spectral data 612 includes spectral data for a known skew condition of a flap in which an inboard support linkage requires repair. In some examples, the reference spectral data 612 includes spectral data for a known skew condition of a flap in which an outboard support linkage requires repair. The reference spectral data 612 can be generated by applying a Fourier Transform to data collected by the sensors during the known skew or non-skew conditions.

The reference spectral data 612 can be received by the controller 120 and stored in the database 604 via one or more user inputs. In some examples, the reference spectral data 612 is generated based on calibration tests performed on the first flap 112 of the example aircraft 100 and stored in the database 604 (e.g., when the aircraft 100 is parked). The example database 604 can store the reference spectral data 612 based on flap type, location(s) of the sensor(s) 400 relative to the support linkages, etc.

In the example system 600 of FIG. 6, the data analyzer 610 uses the reference spectral data 612 to identify characteristic vibration frequency peaks under known non-skew conditions and/or known skew conditions. The peak(s) are indicative of a substantially significant amount of vibration at a specific frequency relative to other vibration frequencies in the frequency spectrum. The data analyzer 610 identifies vibration frequency peak(s) in the spectral data 608 generated from the test data 601 collected by the sensor(s) 400 during, for example, one or more flight phases of the aircraft 100. The data analyzer 610 compares the location(s) of the vibration frequency peaks(s) in the spectral data 608 to the location(s) of the vibration frequency peak(s) in the reference spectral data 612. Based on the comparison, the data analyzer 610 determines whether there is a shift in the locations of the vibration frequency peak(s) of the spectral data 608 relative to the locations of vibration frequency peaks(s) in the reference spectral data 612.

For example, the data analyzer 610 analyzes spectral data 608 generated from test data 601 collected at the first flap 112 by the sensor(s) 400 (e.g., accelerometers) disposed proximate to the first or inboard support linkage 200 during takeoff of the aircraft 100. Based on the analysis, the data analyzer 610 determines that a vibration frequency peak occurs at 20 Hz in the spectral data 608. The data analyzer 610 determines that in reference spectral data 612 collected under known non-skew conditions of the first flap 112, the vibration frequency peak occurs at 27 Hz. Based on the comparison of the vibration frequency peaks in the spectral data 608 and the reference spectral data 612, the data analyzer 610 determines that there is a shift in the vibration frequency peaks between the test data 601 collected from the first flap 112 during takeoff and the reference spectral data 612 (e.g., 27 Hz to 20 Hz).

In the example system 600, the data analyzer 610 interprets shifts in the vibration frequency peaks as indicative of changes in natural vibration frequencies of the first flap 112 and, thus, representative of a skew condition of the first flap 112. For example, the data analyzer 610 determines that the peak shift results from the end of the first flap 112 having an altered natural frequency due to a change in boundary conditions at the flap support(s) (e.g., a greater range of motion due to disruption of the rotational constraint of the first flap 112 at the first support linkage 200). In some examples, the data analyzer 610 verifies the detection of the skew condition of the first flap 112 by comparing the vibration frequency peak(s) in the spectral data 608 to reference spectral data 612 for known skew conditions at the first flap 112 or another flap. In some examples, the data analyzer 610 compares the shift(s) in the vibration frequency peak(s) relative to a predetermined threshold such as a noise threshold.

In the example system 600 of FIG. 6, if the data analyzer 610 detects a shift in the vibration frequency peak(s) in the spectral data 608 relative to the reference spectral data 612, then the data analyzer 610 determines that there is a skew condition at the first flap 112. The example data analyzer 610 identifies the locations of the sensor(s) 400 on the first flap 112 from which the test data 601 was collected based on, for example, sensor location data stored in the example database 604. Based on the location of the sensor(s) 400 from which the test data 601 was generated, the data analyzer 610 determines that the first support linkage 200 and/or the second support linkage 202 requires repair.

The example skew detection manager 602 of FIG. 6 includes an alert generator 614. The example alert generator 614 generates one or more alerts 616 that warn, for example, a pilot of the aircraft 100, maintenance personnel, etc. that the first support linkage 200 and/or the second support linkage 202 require repair. The alert(s) 616 can include a visual warning, such as a text or an image of the wing and/or flap with the location of the support linkage in need of repair highlighted. In some examples, the alert(s) 616 are audible alert(s). The alert generator 614 transmits the alert(s) 616 to an alert output 618 of the aircraft 100. The alert output 618 can include, for example, a display and/or speakers that present the alert(s) 616 based on a format of the alert(s) 616. If a skew condition is not detected by the data analyzer 610, then the alert generator 614 refrains from generating the alert(s) 616.

Thus, the example system 600 of FIG. 6 provides for detection of skew conditions at a flap of an aircraft wing based on changes identified in vibration data collected from the flap. The example skew detection manager 602 detects changes in vibration behavior of the flap (e.g., frequency, vibration mode) that may be indicative of disruptions to the rotational constraints of the flap. Changes in the flap vibration behavior can be detected by the skew detection manager 602 based on, for example, shifts in peaks in a test data frequency spectrum relative to reference data. The example skew detection manager 602 detects skew conditions at the flap based on the changes identified in the vibration data and determines that one or more of the support linkages requires repair. In some examples, the skew detection manager 602 generates alerts indicating that one or more of the support linkages require attention. The example skew detection system 600 of FIG. 6 can collect and analyze vibration data during one or more flights phases such as takeoff or landing and/or substantially continuously during flight to provide substantially real-time monitoring of skew conditions at the flap.

While an example manner of implementing the example skew detection manager 602 is illustrated in FIG. 6, one or more of the elements, processes and/or devices illustrated in FIG. 6 may be combined, divided, re-arranged, omitted, eliminated and/or implemented in any other way. Further, the example database 604, the example data processor 606, the example data analyzer 610, the example alert generator 614, the example alert output 618, and/or more generally, the example skew detection manager 602 of FIG. 6 may be implemented by hardware, software, firmware and/or any combination of hardware, software and/or firmware. Thus, for example, any of the example database 604, the example data processor 606, the example data analyzer 610, the example alert generator 614, the example alert output 618, and/or more generally, the example skew detection manager 602 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 604, the example data processor 606, the example data analyzer 610, the example alert generator 614, the example alert output 618, and/or more generally, the example skew detection manager 602 of FIG. 6 is/are hereby expressly defined to include a tangible computer readable storage device or storage disk such as a memory, a digital versatile disk (DVD), a compact disk (CD), a Blu-ray disk, etc. storing the software and/or firmware. Further still, the example skew detection manager 602 of FIG. 6 may include one or more elements, processes and/or devices in addition to, or instead of, those illustrated in FIG. 6, and/or may include more than one of any or all of the illustrated elements, processes and devices.

Figure 7:
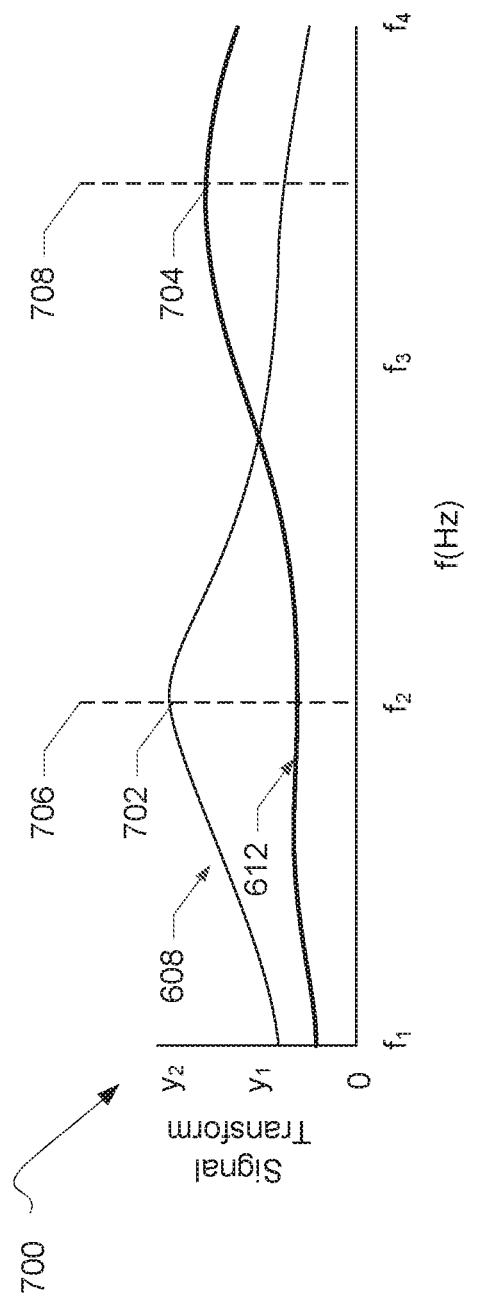
FIG. 7 is a first graph illustrating data processed by the example system of FIG. 6 in accordance with the teachings of this disclosure.

FIG. 7 is an example graph 700 illustrating a frequency spectrum including the spectral data 608 generated by the data processor 606 of the example skew detection manager 602 of FIG. 6. As disclosed above, the example data processor 606 generates the spectral data 608 by applying a Fourier Transform to the test data 601 (e.g., the acceleration data) measured by the sensor(s) 400 coupled to the first flap 112 of the aircraft 100 of FIG. 1. The example graph 700 also includes the reference spectral data 612. In the example of FIG. 7, the reference spectral data 612 is for a known non-skew condition of a flap (e.g., the first flap 112 or another flap). In other examples the reference spectral data 612 can be for a known skew condition of a flap. As illustrated in FIG. 7, the spectral data 608 includes a first peak 702, which, as noted above, represents a substantially significant amount of vibration at a specific frequency relative to other vibration frequencies in the spectrum. As also illustrated in FIG. 7, the first peak 702 of the spectral data 608 is shifted relative to a second peak 704 of the reference spectral data 612 as represented by the respective positions of the dashed lines 706, 708 in the graph 700 of FIG. 7. Based on the shift of the first peak 702 relative to the second peak 704, the data analyzer 610 of the example skew detection manager 602 of FIG. 6 determines there is a skew condition at the first flap 112. In some examples, the alert generator 614 of FIG. 6 generates the alert(s) 616 based on the identification of a skew condition from the vibration frequency peak shift in the test data.

Figure 8:
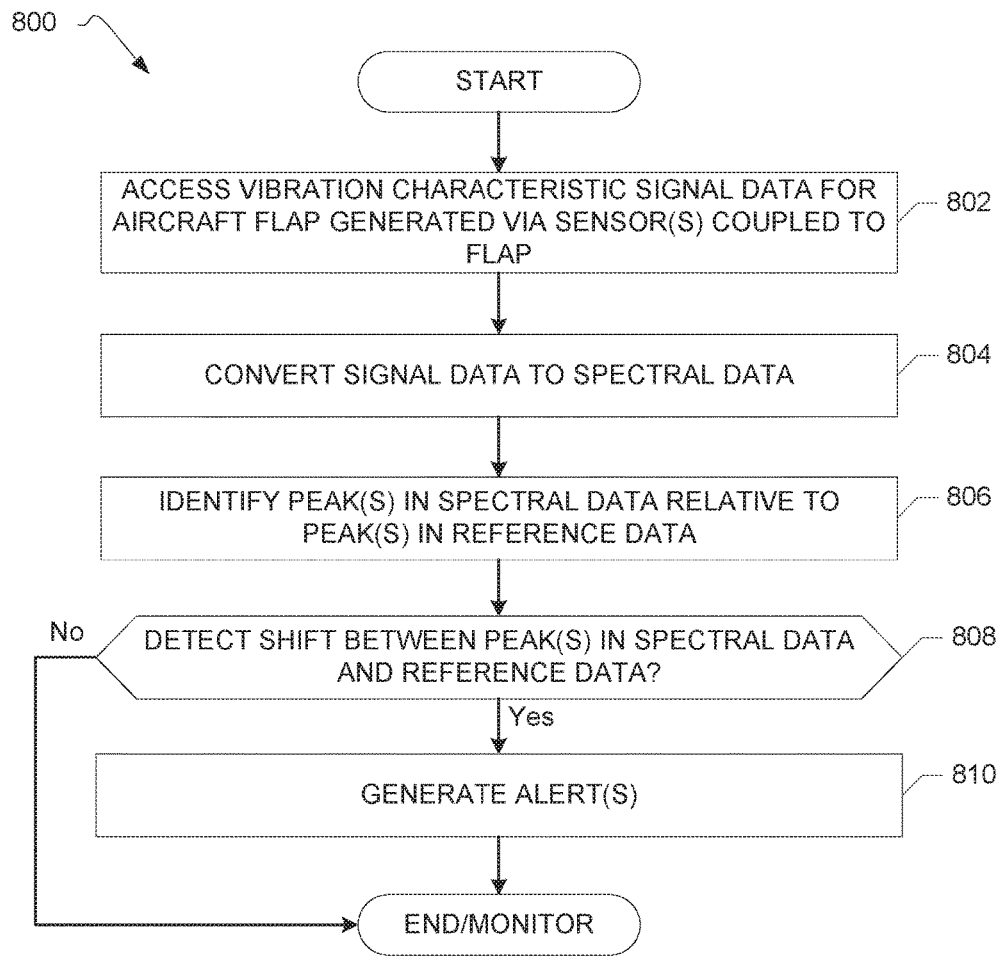
FIG. 8 is a flow diagram of an example method for detecting a skew condition that may be implemented using the first example system of FIG. 6.

FIG. 8 is a flow diagram illustrating a first example method 800 for detecting a skew condition of a flap of an aircraft, such as the example first flap 112 and/or the example second flap 116 of the example aircraft 100 of FIG. 1. The example method 800 can be used to detect skew conditions of other vehicular and/or non-vehicular components. The example method 800 can be used to detect skew conditions of surfaces excited by airflow, such as airflow control surface(s) including flap(s), spoiler(s), etc. The example method 800 can be implemented by the first example skew detection system 600 of FIG. 6.

The example method 800 begins with accessing vibration characteristic signal data for a flap of an aircraft generated via one or more sensors coupled to the flap (block 802). For example, the sensor(s) 400 of FIGS. 4-6 coupled to the example flap(s) 112, 116 of FIGS. 1-6 measure translational and torsional vibration characteristics of the flap(s) 112, 116 and generate test vibration characteristic data 601 based on the measurements. The sensor(s) 400 can measure vibration characteristics of the flap(s) 112, 116 in the x, y, and/or z directions. For example, the sensor(s) 400 can measure acceleration in the x-direction (e.g., the fore-aft direction) of the flap(s) at the location(s) where the sensor(s) 400 are coupled to the flap(s) 112, 116. In some examples, the sensor(s) 400 are disposed proximate to support linkages 200, 202 that couple the flap(s) 112 116 to a respective wing 102, 104 of the example aircraft 100. The sensor(s) 400 can generate the test data 601 during one or more flight phases (e.g., takeoff, landing), substantially continuously during flight, during a dedicated testing period while the aircraft is parked, and/or other instances when the flap may be vibrating due to, for example, impingement of engine air on the flap from the engine(s) 108, 110 of the aircraft 100.

The example method 800 includes converting the vibration characteristic signal data to spectral data (block 804). For example, the data processor 606 of the example skew detection manager 602 of FIG. 6 coverts the test data 601 transmitted to the aircraft controller 120 by the sensor(s) 400 to the frequency domain. The example data processor 606 converts the test data 601 by applying, for example, a Fourier Transform to the test data 601 to generate spectral data 608.

The example method 800 of FIG. 8 includes identifying vibration frequency peak(s) in the spectral data relative to vibration frequency peak(s) in reference data (block 806). For example, the data analyzer 610 of the skew detection manager 602 of FIG. 6 identifies one or more vibration frequency peaks in the spectral data 608 generated from the test data 601. The data analyzer 610 compares the location of the peak(s) in the spectral data 608 to peak(s) in the reference spectral data 612 stored in the example database 604 of the skew detection manager 602. In some examples, the reference spectral data 612 includes spectral data for known non-skew conditions at the flap(s) 112, 116 of the example aircraft 100 of FIG. 1 or another flap (e.g., a flap having a similar design as the flap(s) 112, 116 from which the test data 601 is generated). In some examples, the reference spectral data include spectral data for known skew conditions at the flap(s) 112, 116 or at another flap. In some examples, reference spectral data for known non-skew conditions are analyzed to detect skew at the flap(s) 112, 116.

The example method 800 includes a determination of whether the vibration frequency peak(s) in the spectral data have shifted relative to peak(s) in the reference data (block 808). For example, the data analyzer 610 of FIG. 6 identifies whether the peak(s) in the spectral data 608 are shifted relative to the peak(s) in the reference spectral data 612 for known non-skew conditions (e.g., a peak shift from 27 Hz in the reference spectral data 612 to 20 Hz in the spectral data 608).

The example method 800 of FIG. 8 includes generating one or more alert(s) if shift(s) are detected between the peak(s) in the spectral data and the reference data (block 810). For example, the alert generator 614 generates the alert(s) 616 to warn, for example, the aircraft pilot or maintenance personnel that a skew condition is detected at the flap(s) 112, 116. In some examples, the alert(s) 616 include information about the support linkage(s) 200, 202 that are in need of repair based on, for example, a determination of the location of the sensor(s) 400 from which the test data 601 is generated relative to the support linkages 200, 202 (e.g., based on information or rules 605 about the location of the sensor(s) 400 stored in the database 604). The alert(s) 616 can include, for example, a visual alert and/or an audio alert presented via an alert output 618 (e.g., a display screen, a speaker) of the example aircraft 100 of FIG. 1.

If there is no shift in the vibration frequency peak(s) in the spectral data generated from the vibration characteristic signal data relative to the reference data, the example method 800 of FIG. 8 ends. In some examples, the example method 800 of FIG. 8 includes monitoring the vibration conditions at the flap(s) via the sensor(s) coupled to the flap(s) during one or more flight phases (e.g., takeoff, landing) as part of ongoing monitoring of skew conditions at the flap(s).

The flowchart of FIG. 8 is representative of an example method that may be used to implement the system of FIG. 6. In this example, the method may be implemented using machine readable instructions that comprise a program for execution by a processor such as the controller 120 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the controller 120, but the entire program and/or parts thereof could alternatively be executed by a device other than the controller 120 and/or embodied in firmware or dedicated hardware. Further, although the example program is described with reference to the flowchart illustrated in FIG. 8, many other methods of implementing the example system 600 of FIG. 6 may alternatively be used. For example, the order of execution of the blocks may be changed, and/or some of the blocks described may be changed, eliminated, or combined.

As mentioned above, the example process of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
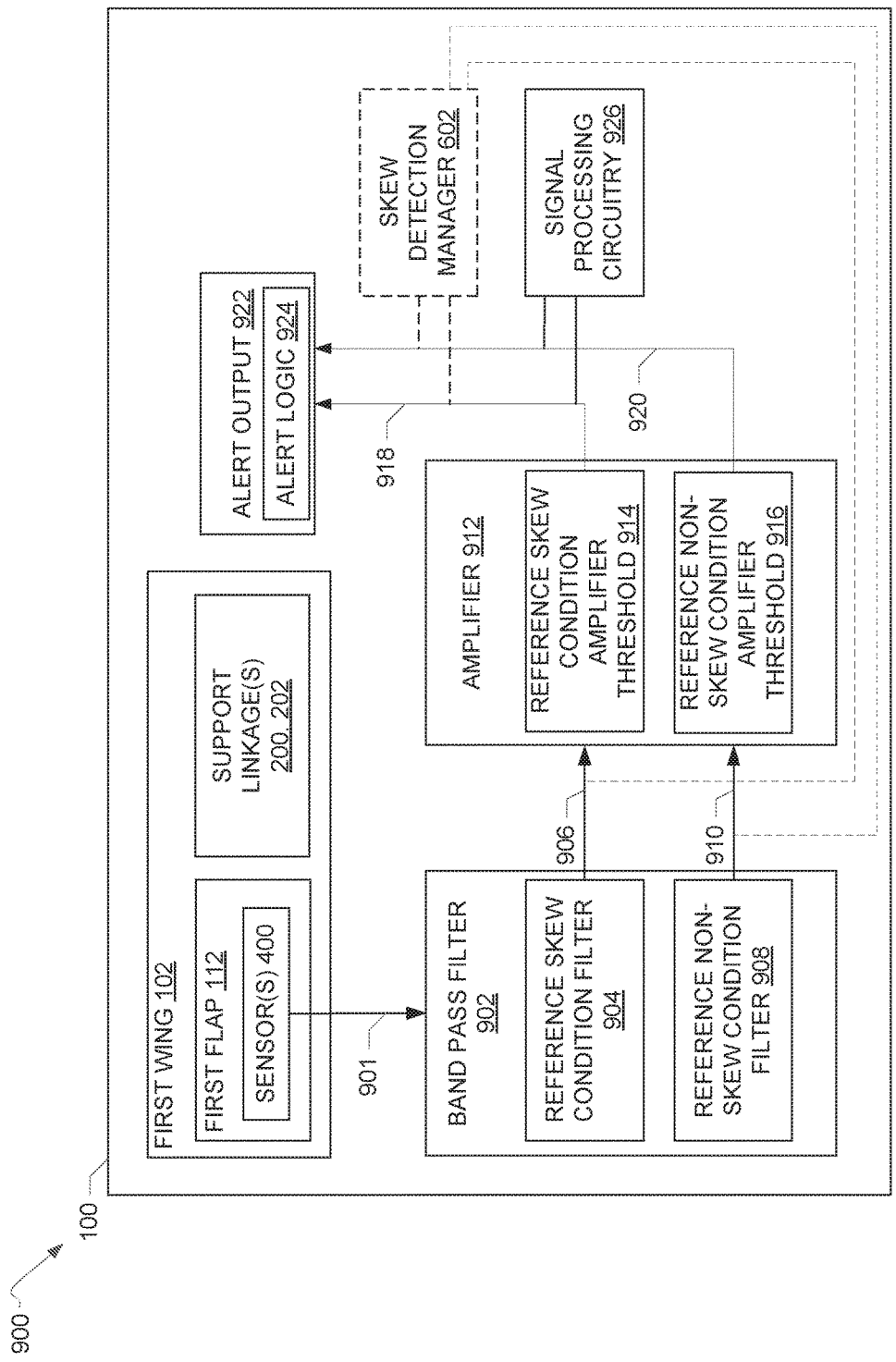
FIG. 9 is a block diagram of a second example skew condition detection system, which may be used to detect a skew condition of a flap of the example aircraft of FIG. 1.

FIG. 9 is a block diagram of a second example system 900 for detecting skew conditions at a flap of an aircraft, such as the first flap 112 of the example aircraft 100 of FIG. 1, based on data collected by one or more sensors coupled to the flap, such as the sensor 400 of FIGS. 4 and 5. As illustrated in FIG. 9, the example aircraft 100 includes the first wing 102 including the first flap 112 coupled thereto via the first and second support linkages 200, 202. The first flap 112 includes one or more sensors 400 coupled thereto as disclosed above in connection with FIGS. 4 and 5. For example, the sensor(s) 400 can be coupled to the first flap 112 proximate to the first support linkage 200 and/or the second support linkage 202. Although the second example skew detection system 900 of FIG. 9 is discussed in connection with the first flap 112 of the aircraft 100 of FIGS. 1-5, the second example skew detection system 900 could be implemented with another flap of the example aircraft 100, such as another flap of the first wing 102 and/or the second flap 116 of the second wing 104. The second example skew detection system 900 of FIG. 9 can also be implemented with other components of the example aircraft 100 of FIG. 1 and/or other vehicles (e.g., other airflow control surfaces such as an aileron or a spoiler).

As disclosed above, the sensor(s) 400 of the example system 900 of FIG. 9 measure vibration characteristics of the first flap 112 and generate signal data indicative of characteristics of the vibrational behavior of the first flap 112. In the example of FIG. 9, the sensor(s) 400 generate vibration characteristic data or test data 901 during one or more flight phases (e.g., takeoff, landing), when the aircraft 100 is parked with the first engine 108 running for testing purposes, etc. The example sensor(s) 400 can include accelerometers and the test data 901 can include raw (e.g., analog) accelerometer data.

In the example of FIG. 9, the analog test data 901 is transmitted to a band pass filter 902. In the example of FIG. 9, the band pass filter 902 of FIG. 9 includes a hardware filter. The example band pass filter 902 of FIG. 9 includes a reference skew condition filter 904. The example reference skew condition filter 904 of FIG. 9 filters the test data 901 based on frequencies corresponding to known skew conditions at a flap (e.g., the first flap 112, a different flap) to generate first filtered test data 906 (e.g., filtered vibration data).

The example band pass filter 902 of FIG. 9 includes a reference non-skew condition filter 908. The example reference non-skew condition filter 908 filters the test data 901 based on frequencies corresponding to known non-skew conditions at a flap (e.g., the first flap 112, a different flap) to generate second filtered test data 910 (e.g., filtered vibration data). The cutoff frequency ranges for filters 904, 908 of the band pass filter 902 can be defined by one or more user inputs at the band pass filter 902.

In the example of FIG. 9, the first filtered test data 906 and the second filtered test data 910 are transmitted to an amplifier 912. The example amplifier 912 of FIG. 9 can include an operational amplifier implemented by hardware. The example amplifier 912 transmits a signal or refrains from transmitting a signal based on a comparison of the filtered signal data to a predefined threshold for the amplifier. In the example of FIG. 9, the transmission of the signal from the amplifier 912 is used to control an output of one or more skew condition alerts.

For example, threshold settings of the amplifier 912 for the transmission of a signal can include a reference skew condition amplifier threshold 914 and a reference non-skew condition amplifier threshold 916. The amplifier thresholds 914, 916 can be determined based on reference voltages for known skew and non-skew conditions at a flap (e.g., the first flap 112, a different flap) from previously collected data (e.g., calibration data, previously collected test data). For example, the reference skew condition amplifier threshold 914 represents a magnitude threshold for detecting a skew condition at the first flap 112. The reference non-skew condition amplifier threshold 916 represents a magnitude threshold for detecting a non-skew condition at the first flap 112

In some examples, a threshold of the amplifier 912 is set to the reference skew condition amplifier threshold 914. In such examples, if the first filtered test data 906 (e.g., the test data 901 filtered by the reference skew condition filter 904) includes data having a magnitude greater than the reference skew condition amplifier threshold 914, then the amplifier 912 generates a skew condition signal 918. The skew condition signal 918 indicates that a skew condition is detected at the first flap 112. If the first filtered test data 906 does not include data having a magnitude great than the reference skew condition amplifier threshold 914, then the amplifier 912 refrains from generating the skew condition signal 918. In such examples, no skew condition is detected at the first flap 112.

In some examples, the threshold of the amplifier 912 is set to the reference non-skew condition amplifier threshold 916. In such examples, if the second filtered test data 910 (e.g., the test data 901 filtered by the reference non-skew condition filter 908) includes data having a magnitude greater than the reference non-skew condition amplifier threshold 916, then the amplifier 912 generates a non-skew condition signal 920. In such examples, no skew condition is detected at the first flap 112. If the second filtered test data 910 does not include data having a magnitude greater than the reference non-skew condition amplifier threshold 916, then the amplifier 912 refrains from generating the non-skew condition signal 920.

In some examples, one of the reference skew condition amplifier threshold 914 or the reference non-skew condition amplifier threshold 916 is used to monitor skew conditions at the first flap 112. In other examples, the reference skew condition amplifier threshold 914 is applied to the first filtered test data 906 and the reference non-skew condition amplifier threshold 916 is applied to the second filtered test data 910 to prevent, for example, a false reading due to signal magnitude variations relative to the threshold magnitudes. Applying the respective thresholds to the filtered test data 906, 910 enables the example system 900 of FIG. 9 to confirm, for example, that the skew condition signal 918 should be generated because the first filtered test data 906 includes data having a magnitude greater than the reference skew condition amplifier threshold 914 and the second filtered test data 910 includes data having a magnitude less than the reference non-skew condition amplifier threshold 916.

In the example of FIG. 9, the skew condition signal 918 and/or the non-skew condition signal 920 are transmitted to an alert output 922 of the example aircraft 100 of FIG. 9. The alert output 922 can includes an alert device such as a cockpit warning light, an alarm, etc. In the example of FIG. 9, if the alert output 922 receives the skew condition signal 918, the alert output 922 (e.g., the warning light) is triggered (e.g., turned on) to alert, for example, the pilot that a skew condition is detected at the first flap 112. If the skew condition signal 918 is not received by the alert output 922, the alert output 922 is not triggered (e.g., the warning light is not turned on). In some examples, the alert output 922 can execute one or more alert operations 924 in response to a signal provided by one or more logic operations (e.g. via a logic gate). These logic operators can be used to monitor the signals 918, 920 and provide a signal indicating a skew condition based on their output. For example, the alert operation(s) 924 can include an AND logic gate with an inverter logic gate to activate the alert output 922 and, thus, provide a warning of a skew condition, based on the transmission of both signals 918, 920 to the alert output 922. An example logic operator be expressed as AND(A+NOT (B)), where if input A (e.g., where A corresponds to the skew condition signal 918) is 1 and input B (e.g., where B corresponds to the non-skew condition signal 920) is 0, the result is 1 (e.g., activate the alert output 922) and where for any other inputs, the result is 0 (e.g., do not activate the alert output 922)).

In some examples, the example system 900 includes signal processing circuitry 926 to process the skew condition signal 918 and/or the non-skew condition signal 920 before the signal(s) 918, 920 are transmitted to the alert output 922. For example, the signal processing circuitry 926 can include filter(s) to clean the signal(s) 918, 920.

Thus, the example system 900 of FIG. 9 provides for detection of skew conditions at a flap without digital processing of the test data generated by the sensor(s) 400 at the flap. The example system 900 of FIG. 9 can check for false positives to provide for accuracy in the skew detection. For example, the band pass filter 902 can filter the test data 901 based on a known skewed peak frequency region and a known non-skewed peak frequency region. If the resulting filtered data includes a peak in the skewed peak frequency region and includes a peak in the non-skewed peak frequency region, then a false positive may be detected. Thus, the example system 900 of FIG. 9 provides a low-cost and efficient means for monitoring skew conditions at the flap based on analog data.

However, although the example of FIG. 9 is discussed above in connection with hardware, the example of FIG. 9 could be implemented by software and/or a combination of hardware and software. For example, as illustrated in FIG. 9, the skew condition signal 918 and/or non-skew condition signal 920 could be transmitted to the example skew detection manager 602 of FIG. 6 (e.g., via the controller 120 of the example aircraft 100). In some such examples, the alert generator 614 of the skew detection manager 602 of FIG. 6 generates the alert(s) 616 based on the skew condition signal 918 and transmit the alert(s) 616 to the alert output 922.

In some examples, the skew condition signal 918 and/or non-skew condition signal 920 are transmitted to the skew detection manager 602 to verify the accuracy of the analog data processing and prevent false positives with respect to the signal(s) 918, 920. For example, the skew detection manager 602 can confirm that an alert should be generated if the amplifier 912 generates the skew condition signal 918 based on the analog test data and if the data analyzer 610 detects a shift in the vibration frequency peaks of the corresponding spectral data. In some examples, if the filtered test data includes substantially significant variations in magnitude such that the amplifier 912 could generate a false positive, then the monitoring of the skew conditions may be performed by the skew detection manager 602. Thus, the example of FIG. 9 provides for efficient monitoring of skew conditions at the first flap 112 via hardware and/or software.

Figure 10:
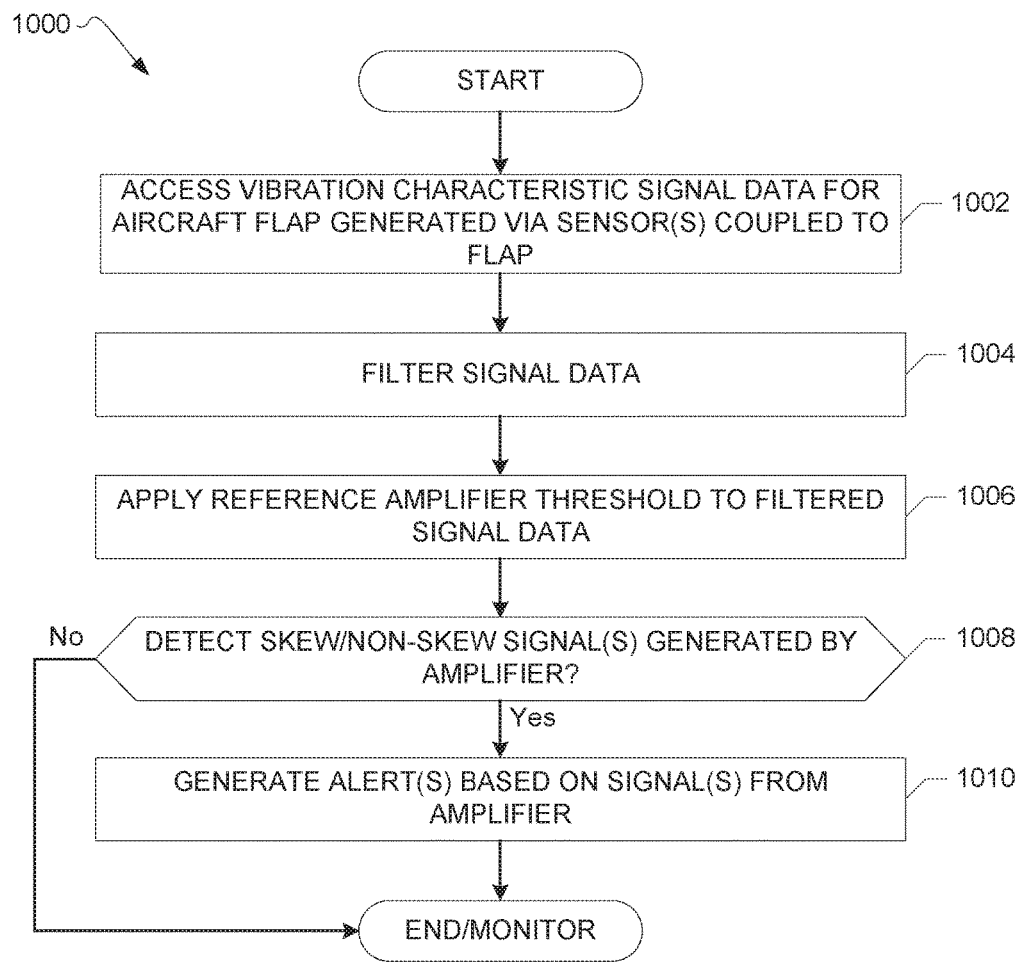
FIG. 10 is a flow diagram of an example method for detecting a skew condition that may be implemented using the second example system of FIG. 8.

FIG. 10 is a flow diagram illustrating a second example method 1000 for detecting a skew condition of a flap of an aircraft, such as the example first flap 112 and/or the example second flap 116 of the example aircraft 100 of FIG. 1. The example method 1000 can be used to detect skew conditions of other vehicular and/or non-vehicular components. The example method 1000 can be used to detect skew conditions of surfaces excited by airflow such as airflow control surface(s) including flap(s), spoiler(s), etc. The example method 1000 can be implemented by the second example skew detection system 900 of FIG. 9. In some examples, the example method 1000 of FIG. 10 is implemented using hardware. In other examples, the example method 1000 of FIG. 10 is implemented using hardware and/or software (e.g., the example skew detection manager 602 of FIGS. 6 and 9).

The example method 1000 begins of FIG. 10 with accessing vibration characteristic signal data for a flap of an aircraft generated via one or more sensors coupled to the flap (block 1002). For example, the sensor(s) 400 of FIGS. 4-6 coupled to the example flap(s) 112, 116 of FIGS. 1-6 measure translational and torsional vibration characteristics of the flap(s) 112, 116 and generate test vibration characteristic data 901 based on the measurements.

The example method 1000 of FIG. 10 includes filtering the vibration characteristic signal data (block 1004). For example, the example band pass filter 902 of FIG. 9 filters the test data 901 by applying the reference skew condition filter 904 and/or the reference non-skew condition filter 908. The band pass filter 902 generates the first filtered test data 906 (e.g., filtered vibration data) based on the reference skew condition filter 904 and/or the second filtered test data 910 (e.g., filtered vibration data) based on the reference non-skew condition filter 908.

The example method 1000 of FIG. 10 includes applying a reference amplifier threshold (e.g., a predetermined threshold) to the filtered signal data (block 1006). For example, the filtered test data 906, 910 is received by the example amplifier 912 of FIG. 9. The example amplifier 912 is set (e.g., via a user input) to apply the reference skew condition amplifier threshold 914 to the first filtered test data 906. Additionally or alternatively, the example amplifier 912 can be set to apply the reference non-skew condition amplifier threshold 916 to the second filtered test data 910.

The example method 1000 of FIG. 10 includes detecting if a skew signal and/or a non-skew signal are transmitted by the amplifier (block 1008). In some examples, the amplifier 912 of FIG. 9 generates a skew condition signal 918 if the first filtered test data 906 includes data greater than the reference skew condition amplifier threshold 914. In such examples, the skew condition signal 918 is transmitted to the alert output 922 of the example aircraft 100 of FIG. 9. The example amplifier 912 of FIG. 9 refrains from generating the skew condition signal 918 if the first filtered test data 906 does not include data greater than the reference skew condition amplifier threshold 914.

In some examples, the amplifier 912 generates a non-skew condition signal 920 if the second filtered test data 910 includes data greater than the reference non-skew condition amplifier threshold 916. In some such examples, the example amplifier 912 of FIG. 9 transmits the non-skew condition signal 920 to the alert output 922. The example amplifier 912 of FIG. 9 refrains from generating the non-skew condition signal 920 if the second filtered test data 910 does not include data greater than the reference non-skew condition amplifier threshold 916.

The example method 1000 of FIG. 10 includes generating alert(s) based on the signal(s) generated by the amplifier (block 1010). For example, if the example amplifier 912 and/or the example signal processing circuitry 926 transmit the skew condition signal 918 to the alert output 922 of FIG. 9, the alert output 922 is activated (e.g., a warning light is turned on). In some examples, the alert output 922 performs one or more logic operations to control the activation of the alert if the amplifier 912 generates the non-skew condition signal 920. In some examples, the alert(s) are generated based on verification of the skew condition signal 918 and/or the non-skew condition signal 920 by the skew detection manager 602 of FIG. 6 to substantially prevent false positives.

Figure 11:
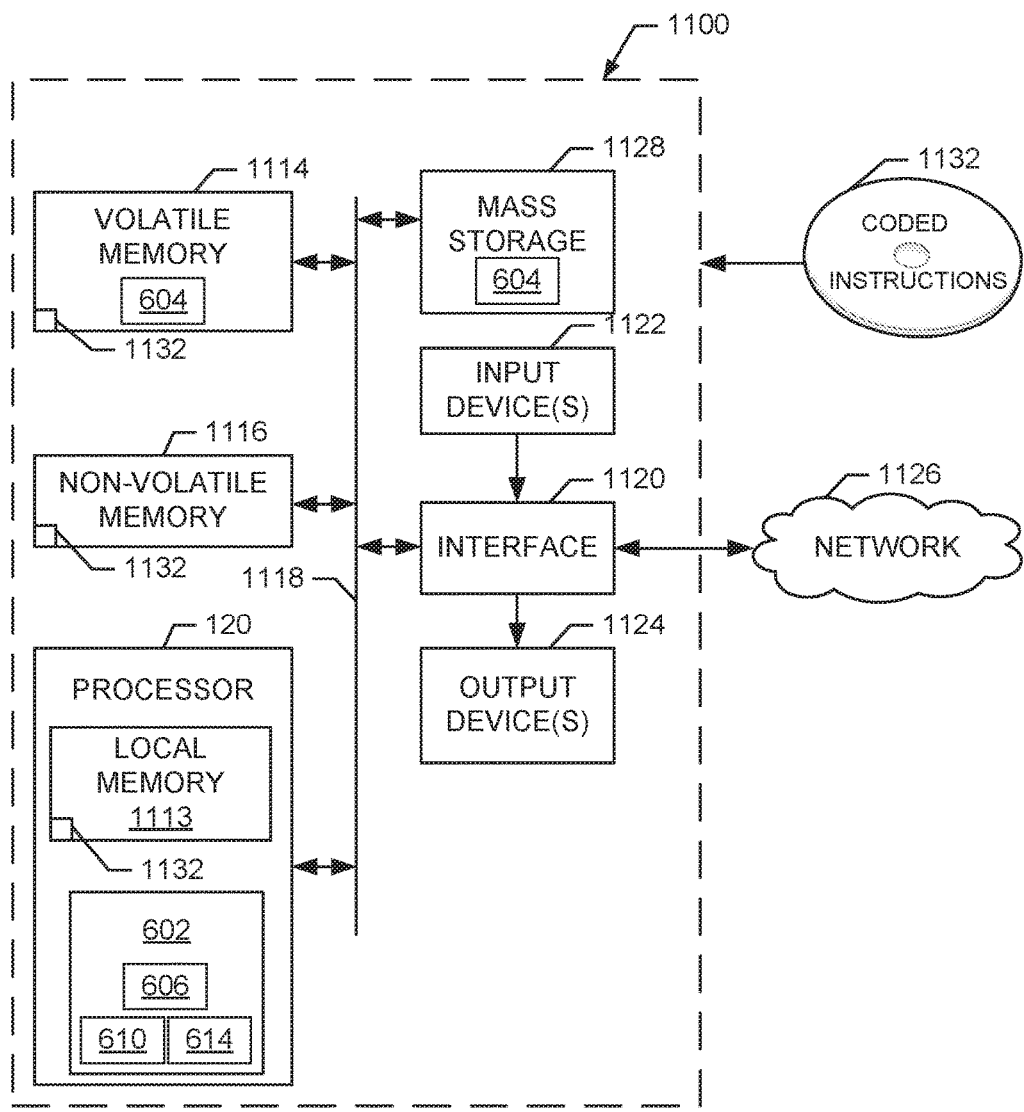
FIG. 11 is a block diagram of an example processor that may be used to carry out the example method of FIG. 10 and/or, more generally, to implement a skew condition manager of the first example system of FIG. 6 and/or the second example system of FIG. 9.

FIG. 11 is a block diagram of an example processor platform 1100 capable of executing instructions to implement the method of FIG. 8 to implement the example skew detection manager 602 of FIGS. 6 and/or 9. The processor platform 1100 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes the controller 120. The controller 120 of the illustrated example is hardware. For example, the controller 120 can be implemented by one or more integrated circuits, logic circuits, microprocessors or controllers from any desired family or manufacturer. In this example, the controller 120 implements the skew detection manager 602 and its components (e.g., the example data processor 606, the example data analyzer 610, and/or the example alert generator 614).

The controller 120 of the illustrated example includes a local memory 1113 (e.g., a cache). The controller 120 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller. The database 604 of the skew detection manager 602 may be implemented by the main memory 1114, 1116.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the controller 120. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor. Alerts of the alert generator 614 may be exported on the interface circuit 420.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 to implement the method of FIG. 8 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed methods, apparatus and articles of manufacture provide for detection of a skew condition of a flap of an aircraft based on vibration characteristic data (e.g., acceleration data measured during vibration of the flap). The detection of a skew condition of the flap can be used to generate alert(s) that warn, for example, aircraft maintenance personnel that one or more of the inboard or outboard support linkages that couple the flap to a wing of the aircraft may need repair. In examples disclosed herein, the use of vibration characteristic data provides for increased sensitivity in detecting skew conditions at a flap and identifying support linkage(s) in need of repair as compared to measuring positional alignment between the support linkage(s).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an aircraft wing;
    a support linkage;
    a flap coupled to the aircraft wing via the support linkage;
    a sensor coupled to the flap at a location proximate to the support linkage, the sensor configured to generate first vibration data for the location; and
    a detector communicatively coupled to the sensor, the detector to:
        identify a change in a rotational constraint of the flap relative to the support linkage based on a shift in a peak of the first vibration data relative to a peak of second vibration data; and
        detect a skew condition of the flap based on the change.

2. The apparatus of claim 1, wherein if the detector detects the skew condition, the detector is to generate an alert and transmit the alert to an alert output of the aircraft.

3. The apparatus of claim 1, wherein the sensor is an accelerometer and the first vibration data includes acceleration data for a location on the flap proximate to the location where the sensor is coupled to the flap.

4. The apparatus of claim 1, wherein the support linkage is a first support linkage and the sensor is a first sensor, and further including a second support linkage and a second sensor, the flap coupled to the wing via the second support linkage, the first sensor disposed proximate to the first support linkage and the second sensor disposed proximate to the second support linkage.

5. The apparatus of claim 4, wherein the detector is configured to detect the skew condition of the flap relative to the first support linkage based on the first vibration data generated by the first sensor.

6. The apparatus of claim 1, wherein the location of the sensor is selected based on a change in magnitude between vibration at a location of the flap when the flap is associated with a non-skew condition and vibration at the location of the flap when the flap is associated with the skew condition.

7. The apparatus of claim 6, wherein the location of the sensor is further selected based on a change in frequency between vibration at the location of the flap when the flap is associated with the non-skew condition and vibration at the location of the flap when the flap is associated with the skew condition.

8. The apparatus of claim 1, further including a filter to filter the first vibration data, the detector to detect the skew condition based on a comparison of the first filtered vibration data to a threshold.

9. The apparatus of claim 8, wherein the filter is configured to:
    apply a first filter to the first vibration data to generate first filtered vibration data;
    apply a second filter to the first vibration data to generate second filtered vibration data;
    perform a first comparison of the first filtered vibration data to a first threshold;
    perform a second comparison of the second filtered vibration data to a second threshold; and
    detect the skew condition based on at least one of the first comparison and the second comparison.

10. The apparatus of claim 1, wherein the second vibration data is predetermined vibration data generated for the flap or another flap.

11. The apparatus of claim 1, wherein the detector is to detect the skew condition as associated with the support linkage based on location data for the sensor.

12. A method comprising:
    generating, via a sensor coupled to an airflow control surface of a vehicle, vibration data for the airflow control surface;
    generating, by executing an instruction with a processor, spectral data based on the vibration data;
    identifying a change in a rotational constraint at the airflow control surface by performing, by executing an instruction with the processor, a comparison of a location of a peak in the spectral data to a location of a peak in predetermined spectral data; and
    detecting, by executing an instruction with the processor, a skew condition of the airflow control surface based on the change.

13. The method of claim 12, wherein the predetermined spectral data corresponds to at least one of a known non-skew condition of the airflow control surface and a known skew condition of the airflow control surface.

14. The method of claim 12, wherein the airflow control surface is a flap of an aircraft and further including:
    identifying a location of the sensor relative to a first support linkage for the flap and a second support linkage for the flap; and
    identifying at least one of the first support linkage and the second support linkage as associated with the skew condition based on the identification.

15. The method of claim 12, further including generating an alert based on the change and transmitting the alert to an alert output of the vehicle.

16. The method of claim 12, wherein the vehicle is an aircraft and generating the vibration data is to occur during one or more of takeoff or landing of the aircraft.

17. A method comprising:
    accessing, by executing an instruction with a processor, vibration data for a flap of an aircraft, the vibration data to be generated by a sensor coupled to the flap, the flap coupled to a wing of the aircraft via a support linkage;
    determining a change in a rotational constraint of the flap relative to the support linkage by performing, by executing an instruction with the processor, a comparison of a position of a peak in the vibration data relative to a position of a peak in predetermined vibration data; and
    identifying a skew condition of the flap based on the change.

18. The method of claim 17, wherein the sensor is coupled to the flap proximate to the support linkage.

19. The method of claim 17, wherein if the skew condition is identified, further including:
   generating an alert indicative of a mechanical impairment at the support linkage; and
   transmitting the alert to an alert output of the aircraft.

* * * * *